US007710082B2

(12) United States Patent
Escobar Valderrama et al.

(10) Patent No.: US 7,710,082 B2
(45) Date of Patent: May 4, 2010

(54) CONTROLLER FOR THE THREE-PHASE CASCADE MULTILEVEL CONVERTER USED AS SHUNT ACTIVE FILTER IN UNBALANCED OPERATION WITH GUARANTEED CAPACITORS VOLTAGES BALANCE

(75) Inventors: Gerardo Escobar Valderrama, San Luis Potosi (MX); Misael Fransisco Martinez Montejano, San Luis Potosi (MX); Andres Alejandro Valdez Fernandez, San Luis Potosi (MX); Raymundo Enrique Torres Olguin, San Luis Potosi (MX)

(73) Assignee: Instituto Potosino De Investigacion Cientifica y Technologica (IPICYT), San Luis de Potosi (MX)

( * ) Notice: Subject to any disclaimer, the term of this patent is extended or adjusted under 35 U.S.C. 154(b) by 266 days.

(21) Appl. No.: 11/975,231

(22) Filed: Oct. 18, 2007

(65) Prior Publication Data
US 2009/0102436 A1 Apr. 23, 2009

(51) Int. Cl.
*G05F 5/04* (2006.01)
(52) U.S. Cl. ............................ 323/207; 363/40; 363/71
(58) Field of Classification Search ................. 323/207; 363/40, 43, 56.02, 65, 71, 98, 132
See application file for complete search history.

(56) References Cited

U.S. PATENT DOCUMENTS

| | | | | |
|---|---|---|---|---|
| 5,047,909 A | * | 9/1991 | Hosoda | 363/40 |
| 5,351,178 A | * | 9/1994 | Brennen et al. | 363/40 |
| 5,751,138 A | * | 5/1998 | Venkata et al. | 323/207 |
| 6,005,788 A | * | 12/1999 | Lipo et al. | 363/71 |
| 6,052,297 A | * | 4/2000 | Akamatsu et al. | 363/84 |
| 6,239,997 B1 | * | 5/2001 | Deng | 363/95 |
| 6,762,947 B2 | * | 7/2004 | Hammond | 363/35 |
| 6,862,199 B2 | * | 3/2005 | Escobar et al. | 363/41 |
| 6,940,187 B2 | * | 9/2005 | Escobar et al. | 307/64 |
| 7,016,793 B2 | * | 3/2006 | Ye et al. | 702/60 |
| 2006/0034104 A1 | * | 2/2006 | Royak et al. | 363/39 |

\* cited by examiner

*Primary Examiner*—Jeffrey L Sterrett
*Assistant Examiner*—Fred E Finch, III
(74) *Attorney, Agent, or Firm*—Defillo & Associates, Inc.; Evelyn A. Defillo

(57) ABSTRACT

The present invention comprises a controller for the cascade H-bridge three-phase multilevel converter used as a shunt active filter. Based on the proposed mathematical model, the controller is designed to compensate harmonic distortion and reactive power due to a nonlinear distorting load. Simultaneously, the controller guarantees regulation and balance of all capacitor voltages. The idea behind the controller is to allow distortion of the current reference during the transients to guarantee regulation and balance of the capacitors voltages. The controller provides the duty ratios for each H-bridge of the cascade multilevel converter.

22 Claims, 8 Drawing Sheets

Schematic diagram of the three-phase five-level cascade H-bridge multilevel converter used in an active filter application.

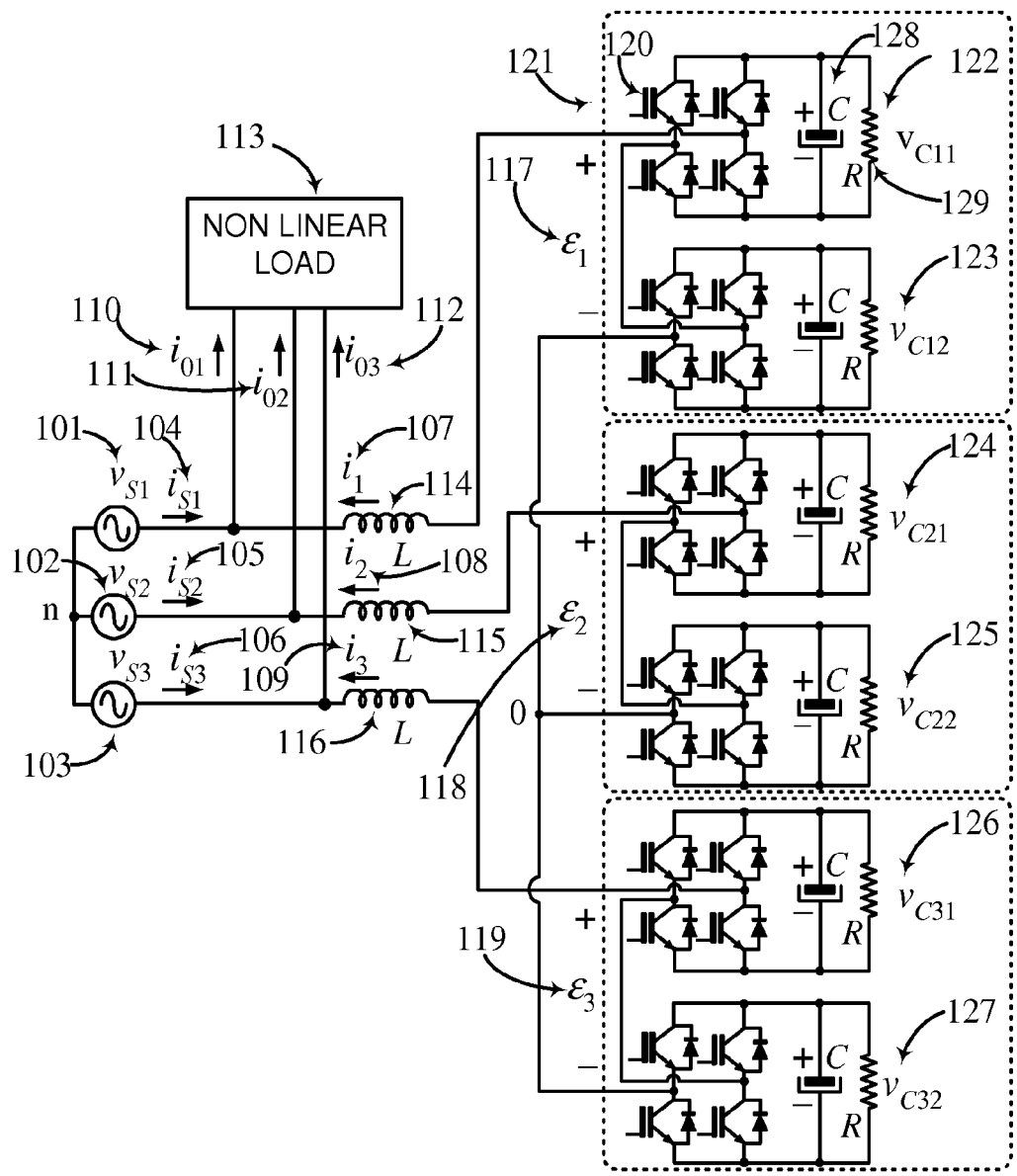
Fig. 1. Schematic diagram of the three-phase five-level cascade H-bridge multilevel converter used in an active filter application.

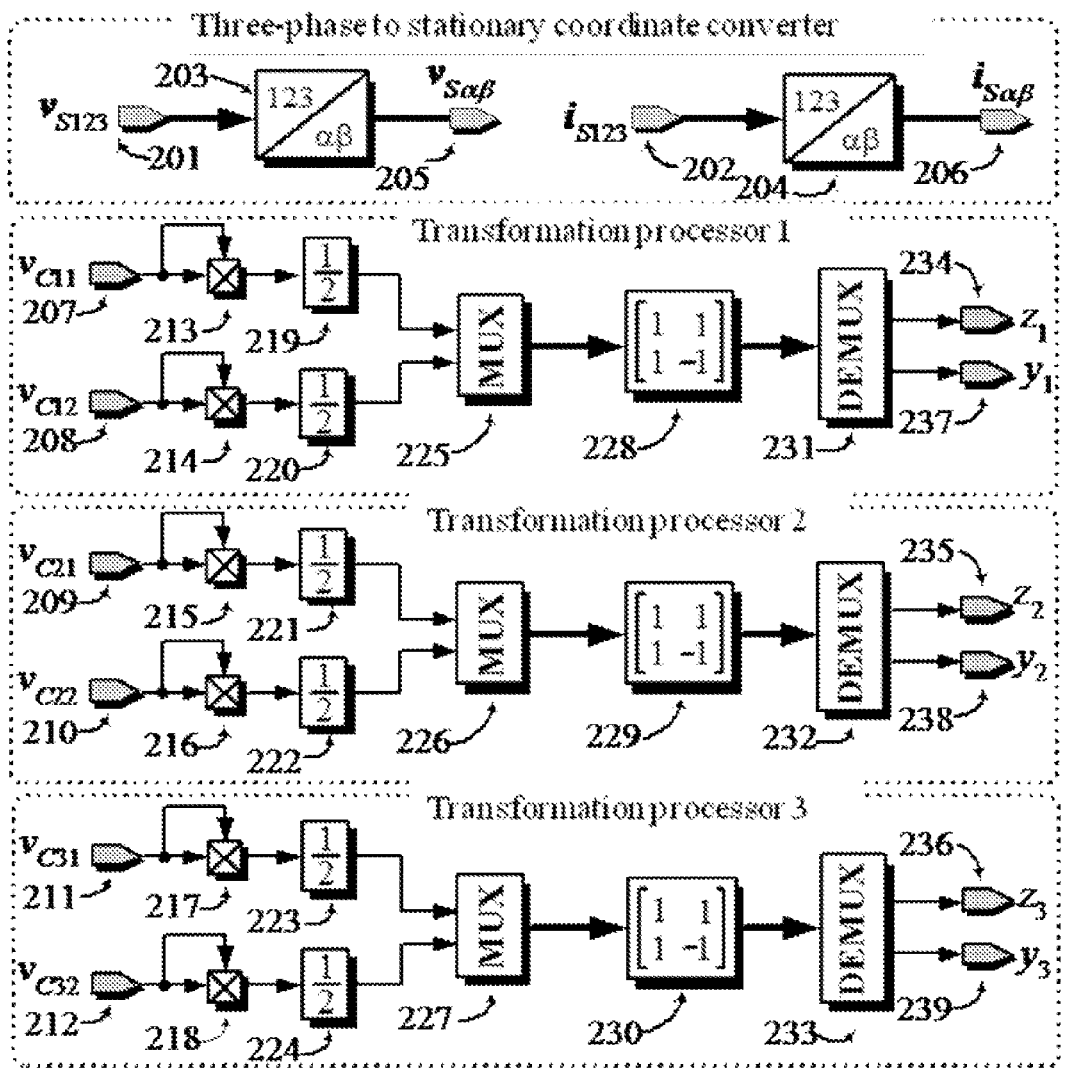
Fig. 2. Block diagrams of the transformation processors and the coordinate converter used to implement the proposed controller.

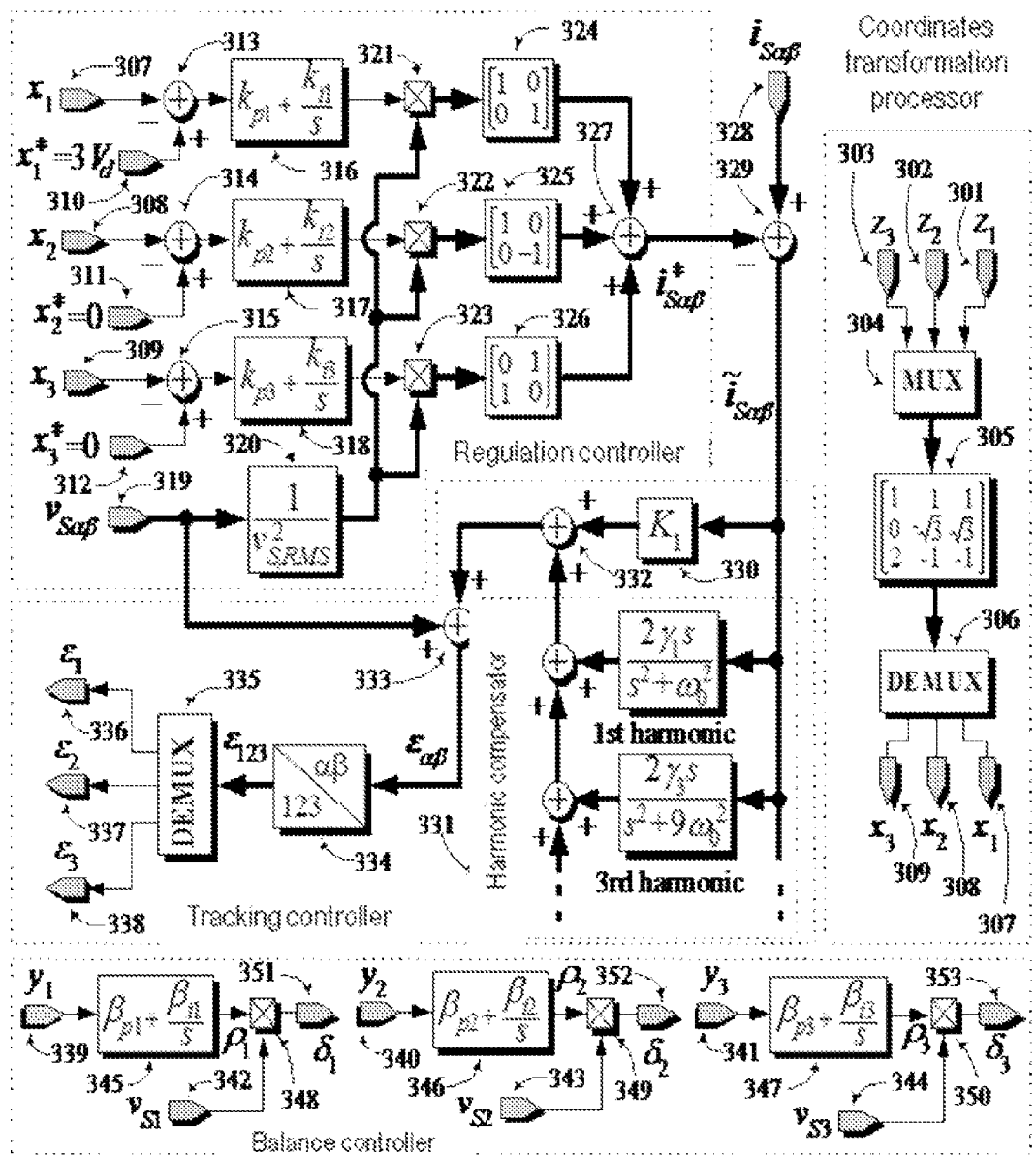
Fig. 3. Block diagram of the overall controller including tracking, regulation and balance control loops as well as the coordinates transformation processor.

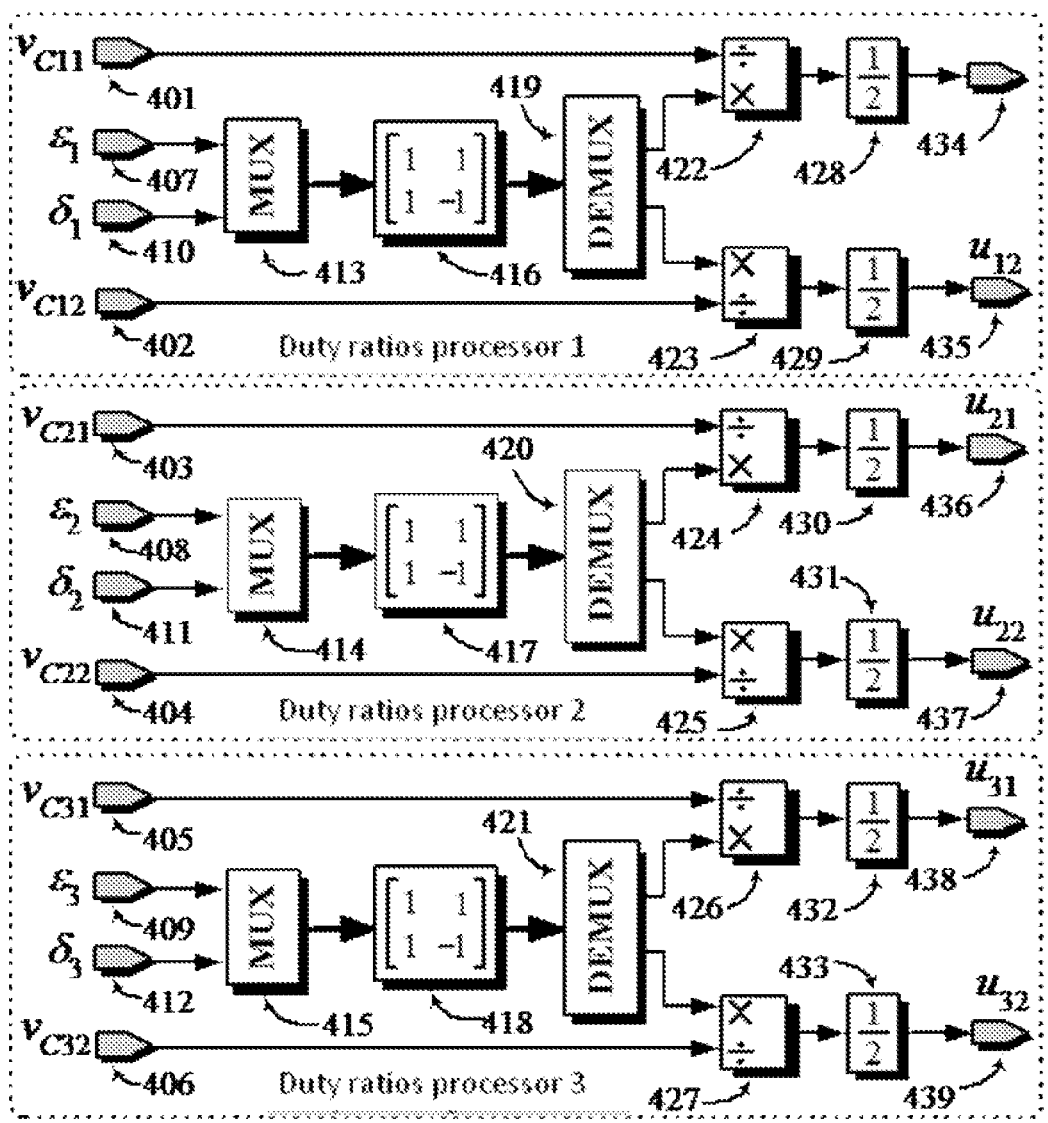
Fig. 4. Block diagrams of the duty ratios processors to generate the control inputs in the original coordinates.

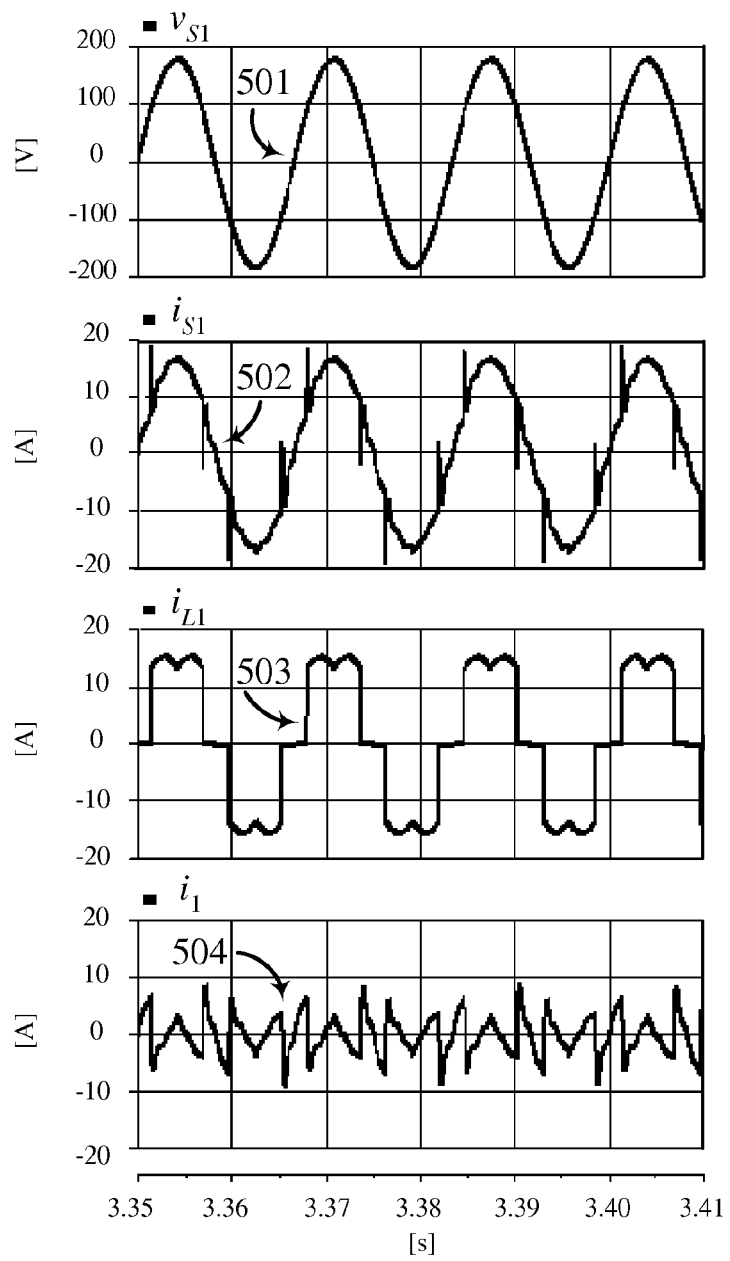
Fig. 5. Steady state responses of the proposed solution: (from top to bottom) line voltage $v_{S1}$, line current $i_{S1}$, load current $i_{o1}$ and injected current $i_1$.

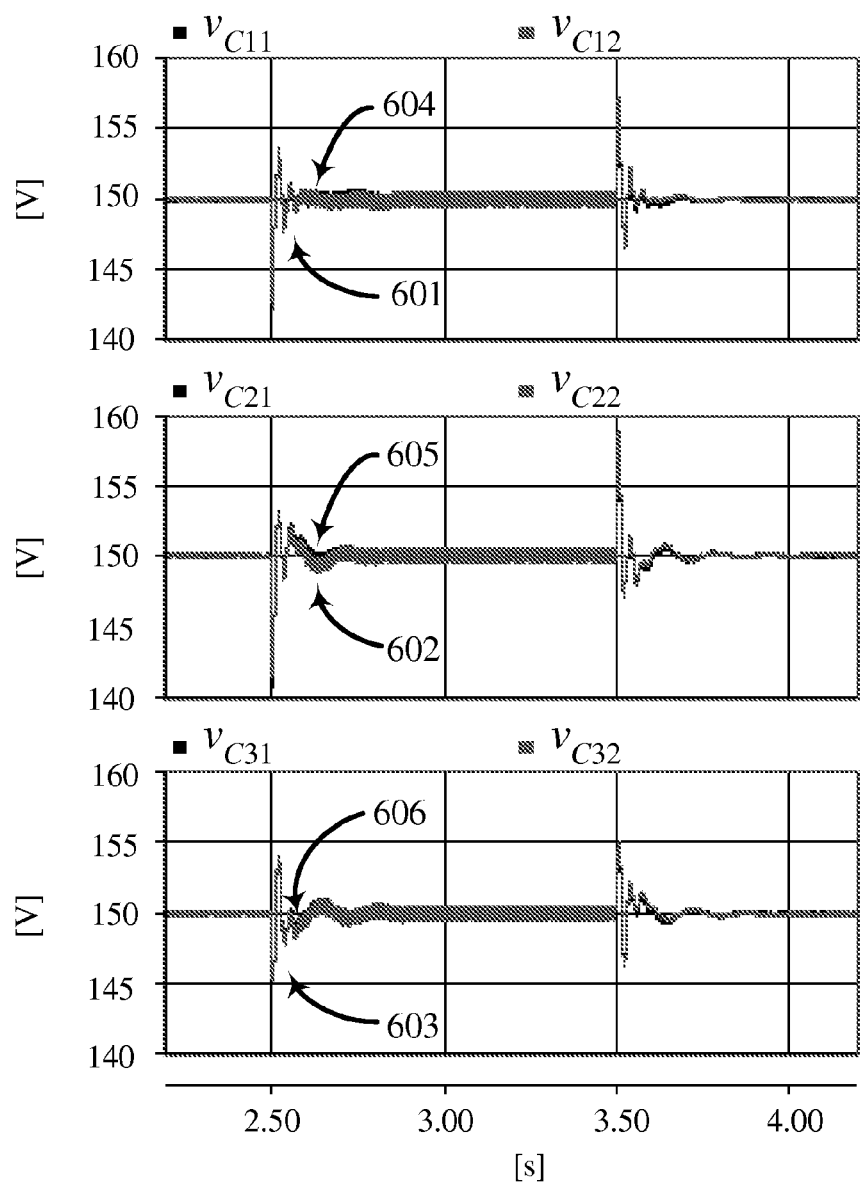
Fig. 6. Transient response of the capacitors voltages during load step changes.

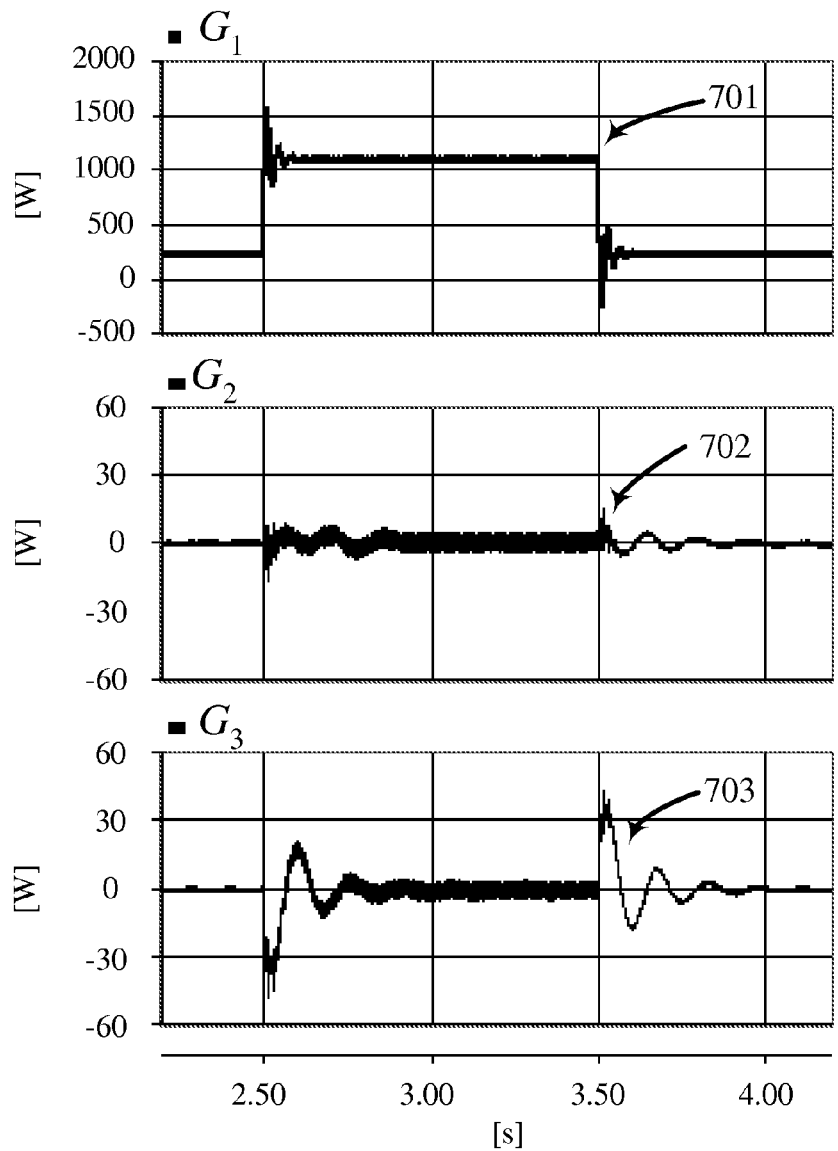
Fig. 7. Transient responses during load step changes: (from top to bottom) scaled apparent conductance $G_1 = g_1 v_{S,RMS}^2$, and extra control inputs $G_2 = g_2 v_{S,RMS}^2$ and $G_3 = g_3 v_{S,RMS}^2$.

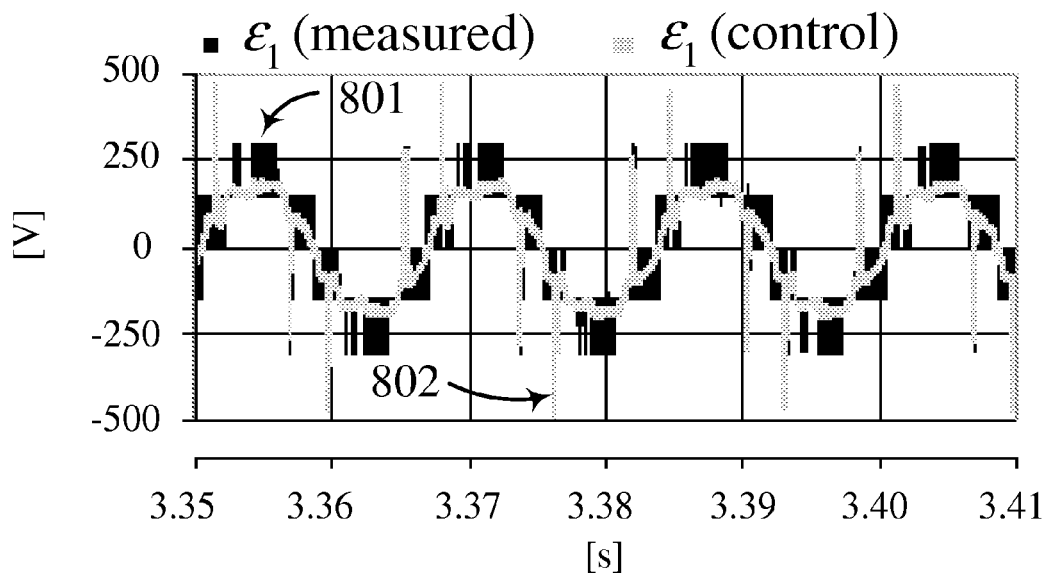
Fig. 8. (gray) Injected voltage $\varepsilon_1$ as computed in the control algorithm, and (black) the real injected voltage using a multicarrier phase-shifted modulation algorithm.

CONTROLLER FOR THE THREE-PHASE CASCADE MULTILEVEL CONVERTER USED AS SHUNT ACTIVE FILTER IN UNBALANCED OPERATION WITH GUARANTEED CAPACITORS VOLTAGES BALANCE

FIELD OF THE INVENTION

The present invention is a controller based on the mathematical model of the cascade multilevel converter. These converters are used in many different applications such as active rectifiers, active filters, inverters, among others. In particular, the invention addresses the control of an active filter, that is, the control is intended for the compensation of reactive power and harmonic distortion in the line current. These disturbances are produced in many industry applications where nonlinear distorting loads are connected to the grid. As the active rectifier is a special case of the active filter application, the invention also is related with the active rectifier application.

BACKGROUND OF THE INVENTION

The technology of multilevel converters has emerged as a very important alternative in the area of a high power medium voltage energy control. Due to the series connection of semiconductors, it is possible to reach medium-high voltages with standard components.

Multilevel converters offer several advantages compared to their conventional counterparts. By synthesizing the AC output terminal voltage from several voltage levels, staircase waveforms can be produced, which in their turn approach the sinusoidal waveform with low harmonic distortion, thus reducing filtering requirements. However, the several sources on the DC side of the converter make multilevel technology difficult to control by the need to balance the several DC voltages. Thus, linear controllers, designed on the basis of the small-signal linearization, are not effective, and stability can not be ensured as large-signal disturbance occur.

Up to now, the topologies for high power multilevel converter are classified in three main types: flying capacitor converter (FC), diode clamped converter (NPC) and cascaded H-bridge converter (HB). These topligies are described in a paper by J. Rodríguez, et al, "Multilevel Inverters: A survey of topologies, controls and applications," *IEEE Trans. on Ind. Electr.*, Vol 49, No. 4, pp. 724-738, August 2002; a paper by R. Teodorescu, et al., "Multilevel Converters: A Survey," in *Proc. EPE'99*, Lausanne, 1999; and a paper by J. S. Lai, et al., "Multilevel Converters—A New Breed of Power Converters," in *Proc. IEEE-IAS Conf.*, 1995, pp. 2441-2548.

Even if the cascaded H-bridge converter has the disadvantage of needing separated DC sources, this topology is an attractive option due to its several advantages, such as, modularity, simplest composition, and reduced number of components (they do not have the need of extra clamping diodes, nor balanced capacitors). Additionally, the structure of multicells in cascade H-bridge allows the nourishment of different charges in DC when it is used in an active rectifier application. See U.S. Pat. No. 6,005,788 titled "Hybrid topology for multilevel power conversion" by Lipo, et al., which is incorporated by reference.

The use of cascaded H-bridges has been successfully implemented in commercially available large drives and some static VAR compensators as reported in F. Z. Peng, et al., "A Multilevel Voltage Source Inverter with Separate DC Sources for Static VAR Generation," in *Proc. IEEE-IAS'95 Conf.*, pp. 2541-2548.

However, H-bridge converters have a major challenge regarding their control. It must guarantee a current almost sinusoidal and in phase with the line voltage in the AC-side and for each phase. Simultaneously, the controller must regulate and stabilize the voltages levels of every single capacitor on the DC-side. This means that the number of available controllers is inferior to the controlled variables. For instance, in a three-phase H-bridge converter of 2n+1 levels (n H-bridge converters in cascade), the control problem consists in controlling n+3 state variables (three currents plus n DC voltages) with only n switching functions. This is due to the fact that every H-bridge cannot be considered as an independent structure to control, as they interact with other cells. For instance, in a branch of a series connection of H-bridges they share the same current and the effective injected voltage is the sum of voltages in every cell.

Generally, an active filter application involves the compensation of harmonic distortion and reactive power, i.e., periodic disturbances, caused by a distorting nonlinear load. Control schemes based on the introduction of a bank of harmonic oscillators (resonant filters) is perhaps one of the most appealed techniques to guarantees rejection of periodic disturbances, thanks to its simplicity and effectiveness. This type of schemes is based on the internal model principle. This principle states that the controlled output can track a class of reference commands without a steady state error if the generator, or the model, of the reference is included in the stable closed-loop system. Therefore, according to the internal model principle, if a periodic disturbance has an infinite Fourier series (of harmonic components), then an infinite number of resonant filters are required to reject such a disturbance. For a detailed description of internal model principle, reference is made to B. Francis and W. Wonham, "The internal model principle for linear multivariable regulators," *Applied Mathematics and Optimization*, Vol. 2, pp. 170-194, 1975, which is incorporated by reference. Applications of this principle to power electronics systems are disclosed in U.S. Pat. No. 6,940,187 titled "Robust controller for controlling a UPS in unbalanced operation" by Escobar, et al., and also in U.S. Pat. No. 60,265,727 titled "Adaptative controller for D-STATCOM in the stationary reference frame to compensate for reactive and harmonic distortion under unbalanced conditions" by Escobar, et al.

SUMMARY OF THE INVENTION

This document presents a controller based on the mathematical model for cascade H-bridge three-phase multilevel converter used as a shunt active filter. This controller is proposed in order to achieve compensation of harmonic distortion and reactive power due to a nonlinear load. This is accomplished by guaranteeing that the line current follows a reference proportional to the line voltage during the steady state. Simultaneously, the controller must guarantee regulation and balance of every single capacitor voltage on the DC-side.

The idea behind the controller is to intentionally introduce certain amount of distortion in the current reference with the aim of achieving balance of all capacitors voltages. At the best, such a distortion will act during the transient only. Once the voltage balance is reached, the distortion vanishes, thus remaining a current reference proportional to the source voltage. Instrumental for these proposal are the several transformations applied on the model that highlight certain structural properties that enormously facilitate the controller design. The three-phase five-level topology is presented, however, the results can be easily scaled to higher levels.

As above mentioned, the controller is based on the mathematical model obtained for cascade H-bridge three-phase multilevel converter used as a shunt active filter. For the control design purposes the averaged model is considered instead of the switched model, i.e., the control inputs represent continuous signals. This is supported by the fact that, for the real implementation, an appropriate modulation technique, such as multi-carrier phase-shifted or level-shifted modulation, with a relative high effective switching frequency is used.

It is also assumed that the inductor current dynamics are faster than the capacitor voltage dynamics. Thus, based on the time scale separation principle, the control design is split in two parts (this is referred in the power electronics literature as the decoupling assumption). First, an inner current (tracking) control loop in which the currents provided by the source are forced to track references which are proportional to the source voltages. Second, an outer voltage control loop, which is divided in two more control loops: a regulation loop that drives the sum of the squares of the capacitor voltages of each branch towards a desired constant value and, a balance loop to force to zero the difference of the squares of the capacitor voltages of each branch. It is shown that, under the assumption that all capacitor voltages maintain a positive value, which is valid in normal operation, the fulfillment of the above control objectives guarantees the regulation of all capacitor voltages towards their constant reference independently.

To make the controller robust against parameters uncertainties, the controller design considers that the system parameters are unknown constants, possibly changing in steps, or that can be slowly varying. To facilitate the design, it is also assumed that the source voltage and the load current are unbalanced periodic signals that contain higher odd harmonics of the fundamental frequency denoted by $\omega_0$ which is assumed to be a known constant. Therefore, even if the amplitudes and phase angles of these components could take arbitrary values, the harmonic coefficients are considered constants.

For the tracking objective a control input is built which cancels measurable disturbances (such as the source voltage) adds a damping term and introduces a bank of resonant filters tuned at the selected harmonics under compensation, i.e., odd harmonics, to cancel the periodic disturbance. Controllers with this similar structure can be found in the literature as resonant regulator, PIS compensator, stationary-frame generalized integrator, etc.

As described in more detail below, balancing was possible after the introduction of extra control inputs that intentionally distort the current reference. However, this distortion lasts during transients only, and vanishes in the stationary state. Based on this idea, a current reference is designed which comprises a linear combination of vectors of periodic signals with different phase shifts and possibly different sequences. Each of these signals having an associated multiplying gain, namely, $g_1, g_2, g_3$. In particular, the first gain $g_1$ is associated to a vector signal proportional to the source voltage. Therefore, it must be guaranteed that gain $g_1$ reaches a non zero constant value in the stationary state, while the other two gains $g_2$ and $g_3$ causing the distortion vanish. The definition of the current reference in this way constitutes the main contribution of this work.

The regulation objective is solved by designing $g_1, g_2$ and $g_3$ which are required to construct the current reference. These control loops are formed by proportional plus integral schemes operating on the corresponding error signal.

BRIEF DESCRIPTION OF THE DRAWINGS

FIG. 1 shows a schematic diagram of the three-phase five-level cascade H-bridge multilevel converter used in an active filter application.

FIG. 2 shows a block diagrams of the transformation processors and the coordinate converter used to implement the proposed controller.

FIG. 3 shows a block diagram of the overall controller including tracking, regulation and balance control loops as well as the coordinate transformation processor.

FIG. 4 shows block diagrams of the duty ratios processors to generate the control inputs in the original coordinates.

FIG. 5 shows steady state responses of the proposed solution: (from top to bottom) line voltage, line current, load current and injected current.

FIG. 6 shows a transient response of the capacitors voltages during load step changes.

FIG. 7 shows transient responses during load step changes: (from top to bottom) scaled apparent conductance $G_1=g_1 v_{S,RMS}^2$, and extra control inputs $G_2=g_2 v_{S,RMS}^2$ and $G_3=g_3 v_{S,RMS}^2$.

FIG. 8 shows (gray) Injected voltage $\epsilon_1$ as computed in the control algorithm, and (black) the real injected voltage using a multicarrier phase-shifted modulation algorithm.

DETAILED DESCRIPTION OF THE INVENTION

The schematic of the three-phase five-level cascade H-bridge converter is shown in FIG. 1. The block diagrams of the proposed controller are shown in FIG. 2 and FIG. 3. The modeling process is divided in two stages. First, the expressions for the model following Kirchhoff's laws are obtained. Second, the model is transformed and expressed in $\alpha\beta$-coordinates.

All along the document bold typeface characters represent either vectors or matrices, while normal typeface characters represent scalars.

The expressions of the model after application of the Kirchhoff's laws to the schematic in FIG. 1 (considering the IGBTs ideal switches) yields the following system $$L\frac{d}{dt}i_{S123} = v_{S123} - B\varepsilon_{123} + L\frac{d}{dt}i_{0123} \qquad (1)$$

$$C\frac{d}{dt}z_1 = \varepsilon_1(i_{S1} - i_{01}) - \frac{2z_1}{R}, \quad C\frac{d}{dt}y_1 = \delta_1(i_{S1} - i_{01}) - \frac{2y_1}{R}$$

$$C\frac{d}{dt}z_2 = \varepsilon_2(i_{S2} - i_{02}) - \frac{2z_2}{R}, \quad C\frac{d}{dt}y_2 = \delta_2(i_{S2} - i_{02}) - \frac{2y_2}{R}$$

$$C\frac{d}{dt}z_3 = \varepsilon_3(i_{S3} - i_{03}) - \frac{2z_3}{R}, \quad C\frac{d}{dt}y_3 = \delta_3(i_{S3} - i_{03}) - \frac{2y_3}{R}$$

where the input control signals have been redefined as $$\varepsilon_1 = u_{11}v_{C11} + u_{12}v_{C12}, \quad \delta_1 = u_{21}v_{C21} - u_{22}v_{C22} \qquad (2)$$

$$\varepsilon_2 = u_{21}v_{C21} + u_{22}v_{C22}, \quad \delta_2 = u_{11}v_{C11} - u_{12}v_{C12}$$

$$\varepsilon_3 = u_{31}v_{C31} + u_{32}v_{C32}, \quad \delta_3 = u_{31}v_{C31} - u_{32}v_{C32}$$

the states are redefined according the following functions $$z_1 = \frac{v_{C11}^2}{2} + \frac{v_{C21}^2}{2}, \quad y_1 = \frac{v_{C11}^2}{2} - \frac{v_{C21}^2}{2} \qquad (3)$$

$$z_2 = \frac{v_{C21}^2}{2} + \frac{v_{C22}^2}{2}, \quad y_2 = \frac{v_{C21}^2}{2} - \frac{v_{C22}^2}{2}$$

$$z_3 = \frac{v_{C31}^2}{2} + \frac{v_{C32}^2}{2}, \quad y_3 = \frac{v_{C31}^2}{2} - \frac{v_{C32}^2}{2}$$

and matrix B is given by $$B = \frac{1}{3}\begin{pmatrix} 2 & -1 & -1 \\ -1 & 2 & -1 \\ -1 & -1 & 2 \end{pmatrix} \qquad (4)$$

Variables $u_{ij}$ ($i \in \{1,2,3\}, j \in \{1,2,3\}$) denote the switch position for the ij-th H-bridge (i for the branch and j for the position of the H-bridge in the branch) and acts as the original control input. In the average model case these control inputs are considered continuous signals taking values in the range [−1, 1]. As above explained, this is supported by the fact that, in the real implementation, an appropriate modulation technique with a relative high switching frequency is used.

To facilitate the control design the model is expressed in terms of the line currents, instead of the injected currents as usual. Notice also that variables $z_i$ and $y_i$ ($i \in \{1,2,3\}$) represent the i-th dynamics of the sum and difference of the squares of the capacitor voltages, respectively.

The model is transformed into conventional $\alpha\beta$-coordinates, using the normalized Clarke's transformation $$T = \sqrt{\frac{2}{3}}\begin{pmatrix} 1 & -1/2 & -1/2 \\ 0 & \sqrt{3}/2 & -\sqrt{3}/2 \\ 1/\sqrt{2} & 1/\sqrt{2} & 1/\sqrt{2} \end{pmatrix} \qquad (5)$$

Thus, the final expression for the model takes the form $$L\frac{d}{dt}i_{S\alpha\beta} = v_{\alpha\beta} - \varepsilon_{\alpha\beta} + L\frac{d}{dt}i_{o\alpha\beta} \qquad (6)$$

$$C\dot{x}_1 = \varepsilon_{\alpha\beta}^T \begin{bmatrix} 1 & 0 \\ 0 & 1 \end{bmatrix} i_{S\alpha\beta} - \frac{2x_1}{R}$$

$$C\dot{x}_2 = \varepsilon_{\alpha\beta}^T \begin{bmatrix} 1 & 0 \\ 0 & -1 \end{bmatrix} i_{S\alpha\beta} - \frac{2x_2}{R}$$

$$C\dot{x}_1 = \varepsilon_{\alpha\beta}^T \begin{bmatrix} 0 & 1 \\ 1 & 0 \end{bmatrix} i_{S\alpha\beta} - \frac{2x_3}{R}$$

where the following transformation has been considered $$\begin{bmatrix} x_1 \\ x_2 \\ x_3 \end{bmatrix} = \begin{bmatrix} 1 & 1 & 1 \\ 0 & -\sqrt{3} & \sqrt{3} \\ 2 & -1 & -1 \end{bmatrix} \begin{bmatrix} z_1 \\ z_2 \\ z_3 \end{bmatrix}. \qquad (7)$$

This nonsingular linear transformation is instrumental for the control design as it permits to write the model in the form shown in (6), that is, matrices $$M_1 = \begin{bmatrix} 1 & 0 \\ 0 & 1 \end{bmatrix}, M_2 = \begin{bmatrix} 1 & 0 \\ 0 & -1 \end{bmatrix}, M_3 = \begin{bmatrix} 0 & 1 \\ 1 & 0 \end{bmatrix}$$

appear explicitly in the model, all of them affecting the source currents vector. This structure is used next to design the currents reference vector.

Based on this model the control objectives can be stated as follows:

Tracking: Consists in forcing the source currents vector to track a reference vector which, in the steady state, is proportional to the corresponding source voltages vector, that is, $i_{S\alpha\beta} \to i^*_{S\alpha\beta}$ as $t \to \infty$ where the current reference is designed according to $$i^*_{S\alpha\beta} = g_1 \begin{bmatrix} 1 & 0 \\ 0 & 1 \end{bmatrix} v_{S\alpha\beta} + g_2 \begin{bmatrix} 1 & 0 \\ 0 & -1 \end{bmatrix} v_{S\alpha\beta} + g_3 \begin{bmatrix} 0 & 1 \\ 1 & 0 \end{bmatrix} v_{S\alpha\beta} \qquad (8)$$

$$= g_1 M_1 v_{S\alpha\beta} + g_2 M_2 v_{S\alpha\beta} + g_3 M_3 v_{S\alpha\beta}$$

where $g_1$ represents the apparent conductance observed by the source, and $g_2$ and $g_3$ are two extra control inputs required to accomplish the regulation and balancing objectives. Notice that these two extra control inputs distort the reference current in order to balance the capacitor voltages; once the voltages are balanced, the extra control inputs vanish as well as the distortion, thus, making the current reference proportional to the source voltage in the steady state. Notice also that the form of this reference, i.e., the introduction of matrices $M_1$, $M_2$ and $M_3$ is directly related with the form of model (6).

Regulation: The sums of the squares of the capacitor voltages should be regulated to a given constant level, that is, $z_k \to V_d^2$, $\forall k \in \{1,2,3\}$, which is equivalent to guarantee that $x_1 \to 3V_d^2$, $x_2 \to 0$, $x_3 \to 0$.

Balancing: Consists in zeroing the difference of the squares of the capacitor voltages, that is, $y_1 \to 0$, $y_2 \to 0$, $y_3 \to 0$.

To accomplish the above control objectives, a controller is designed in three loops as described next:

A1. Current tracking loop. For the tracking objective, the control input $\varepsilon_{\alpha\beta}$ is built in the following form $$\varepsilon_{\alpha\beta} = K_1 \tilde{i}_{S\alpha\beta} + v_{S\alpha\beta} + \sum_{k \in \{1,3,5,\ldots\}} \text{diag}\left(\frac{2\gamma_k s}{s^2 + k^2\omega^2}, \frac{2\gamma_k s}{s^2 + k^2\omega^2}\right)\tilde{i}_{S\alpha\beta} \qquad (9)$$

where $\tilde{i}_{S\alpha\beta} = (i_{S\alpha\beta} - i^*_{S\alpha\beta})$ represents the tracking error vector, and $K_1 > 0$, $\gamma_k > 0$ ($k \in \{1,3,5,\ldots\}$) are positive design parameters representing the damping gain, and the gain of the k-th resonant converter, respectively. Notice that this control input cancels $v_{S\alpha\beta}$, adds a damping term of the form $K_1 \tilde{i}_{S\alpha\beta}$ and introduces a bank of resonant filters tuned at the harmonics under compensation (odd harmonics) to compensate the periodic disturbance.

B1. Voltage regulation loop. To solve the regulation and the balance objectives, it is assumed (decoupling assumption) that the current tracking objective has been reached, that is, $i_{S\alpha\beta} = i^*_{S\alpha\beta}$, and that the bank of resonant filters have reconstructed the disturbances. Using these assumptions in the voltage dynamics equations described in (6) and after some straightforward computations yields the following expressions $$C\dot{x}_1 = g_1 v_{S\alpha\beta}^2 - \frac{2x_1}{R} + \varphi_1 \qquad (10)$$

$$C\dot{x}_2 = g_2 v_{S\alpha\beta}^2 - \frac{2x_2}{R} + \varphi_2$$

$$C\dot{x}_3 = g_3 v_{S\alpha\beta}^2 - \frac{2x_3}{R} + \varphi_3$$

where $\phi_1$, $\phi_2$ and $\phi_3$ are disturbances composed mainly by higher order harmonics. The form of the expressions above is due to the application of the following properties of the symmetric matrices $M_1$, $M_2$ and $M_3$ $$M_1^2 = M_2^2 = M_3^2 = I_2 \quad \text{[involution]}$$

$$\xi_{\alpha\beta}^T M_2 M_3 \xi_{\alpha\beta} = 0, \forall \xi_{\alpha\beta} \quad \text{[skew-simmetry]}$$

$$\xi_{\alpha\beta}^T M_2 \xi_{\alpha\beta} = \xi_\alpha^2 - \xi_\beta^2$$

$$\xi_{\alpha\beta}^T M_3 \xi_{\alpha\beta} = 2\xi_\alpha \xi_\beta$$

where $I_2$ is the identity matrix of dimension 2×2.

The regulation objective is solved by designing $g_1$, $g_2$ and $g_3$ (required to construct the reference $i^*_{S\alpha\beta}$ given by (8)) that guarantee regulation of variables $x_1$, $x_2$ and $x_3$ towards their corresponding references $x_1 \to 3V_d^2$, $x_2 \to 0$, $x_3 \to 0$. For this purpose proportional plus integral schemes operating on the corresponding error signals as proposed as follows $$g_1 v_{S,RMS}^2 = -k_{p1}\tilde{x}_1 - k_{i1} \int_0^t \tilde{x}_1 dt \qquad (11)$$

$$g_2 v_{S,RMS}^2 = -k_{p2}x_2 - k_{i2} \int_0^t x_2 dt$$

$$g_3 v_{S,RMS}^2 = -k_{p3}x_3 - k_{i3} \int_0^t x_3 dt$$

where $\tilde{x}_1 \square (x_1 - 3V_d^2)$; $k_{p1}$, $k_{i1}$, $k_{p2}$, $k_{i2}$, $k_{p3}$ and $k_{i3}$ are the gains of the proportional plus integral (PI) schemes, all of them are selected positive, and $v_{S,RMS}$ is the RMS value of the source voltages vector, which is considered a constant.

B2. Voltage balance loop. For the voltage balance objective, the control inputs $\delta_1$, $\delta_2$ and $\delta_3$ are designed to force the squares of the capacitor voltages to zero. This control loop is built as follows $$\delta_1 = \rho_1 v_{S1}, \delta_2 = \rho_2 v_{S2}, \delta_3 = \rho_3 v_{S3} \qquad (12)$$

where the auxiliary variables $\rho_1, \rho_2$ and $\rho_3$ are formed by a proportional plus an integral term over the corresponding variables $y_1, y_2$ and $y_3$ as follows $$\rho_1 = -\beta_{p1} y_1 - \beta_{i1} \int_0^t y_1 dt \qquad (13)$$

$$\rho_2 = -\beta_{p2} y_2 - \beta_{i2} \int_0^t y_2 dt$$

$$\rho_3 = -\beta_{p3} y_3 - \beta_{i3} \int_0^t y_3 dt$$

where $\beta_{p1}, \beta_{i1}, \beta_{p2}, \beta_{i2}, \beta_{p3}$ and $\beta_{i3}$ are the proportional and integral gains of the PI schemes, all of them are selected positives.

Design criteria for the controller parameters. The bandwidth of the controller frequency response is limited by the maximum frequency of sampling/commutation. Usually, the bandwidth of the current loop is desired to be 1/10 of the sampling frequency. Based on this, an approximate procedure is followed to find an initial setting of the parameters for the current tracking control loop. First, is it proposed to set $K_1$ equal to $2\pi f_{ic} \cdot L$, where $f_{ic}$ is the desired current loop bandwidth, in this case, $f_{ic} = f_{sw}/10$. Second, the remaining transfer function seen by the plurality of resonant filters is a first order low pass filter having a pole at $2\pi f_{ic}$. Disregarding, for simplicity, the influence of such a pole, we can set the gain $\gamma_k$ as $\gamma_k = 2.2 T_{kr}$, where $T_{kr}$ is the desired response time for each harmonic component (evaluated between the 10% and 90% of a step response of the amplitude of the corresponding sinusoidal perturbation). This relation is exact only when different band-pass filters give independent contributions. In a general case, however, this procedure gives a useful estimate of controller parameters given the desired response time for various harmonic components.

In the first outer loop, corresponding to the regulation of the capacitor voltages, the parameter selection is guided by conventional techniques given the desired regulation loop bandwidth and phase margin. Note, however, that due to the ripple on the dc-voltage at twice the supply frequency during unbalanced conditions, the voltage loop bandwidth should be limited to approximately 10-20 Hz in order to avoid possible amplification of the second harmonic in the line current reference.

In the second outer loop, corresponding to the balance of the capacitor voltages, the parameter selection is guided also by conventional techniques. The main consideration in this outer loop is that the response in frequency of the controllers is limited by the response in frequency of the first outer loop. The response in frequency in this loop is usually set 1/5 of the response in frequency of the regulation loop.

Simulation parameters. For simulations the following elements have been considered.

A three phase voltage source of 220 Vrms at $f_0$=60 Hz ($\omega_0$=377 rad/s).

The nonlinear distorting load is composed of a three-phase diode bridge rectifier with a resistive load taking values of 20Ω and 100Ω. To create the unbalance, a resistor of 100Ω is connected between two phases.

The overall load produces an unbalanced distorted current containing odd harmonics ($k \in \{1,3,5,7,9,11,13\}$) of the fundamental frequency ($f_0$=60 Hz). The active filter has been designed with parameters L=3 mH, C=2200 μF, and it has been assumed that the losses take the value R=2.2 KΩ. The switching frequency for the switching devices is fixed to 20 kHz.

The control design parameters are fixed to: $V_d$=150, $\gamma_k$=200×k$\omega_0$ (k∈{1,3,5,7,9,11,13}), $K_1$=30, $k_{p1}$=0.05, $k_{i1}$=0.02, $k_{p2}$=0.00937, $k_{i2}$=0.000937, $k_{p3}$=0.00937, $k_{i3}$=0.000937, $\beta_{p1}$=10.89, $\beta_{i1}$=0.1815, $\beta_{p2}$=10.89, $\beta_{i2}$=0.1815, $\beta_{p3}$=10.89, $\beta_{i3}$=0.1815.

DESCRIPTION OF THE DRAWINGS

FIG. 1 depicts a three-phase cascade H-bridge multilevel converter used as a shunt active filter. The system includes a power grid that provides source currents 104, 105, and 106 corresponding to the first, second, and third phase, respectively, along with the corresponding source voltages 101, 102, and 103. The load 113 is composed by a three phase nonlinear distorting load current, one distorted current for each phase, with the only restriction that their sum is equal to zero. As loads on all three phases are different from each other, the load currents 110, 111, and 112 are unbalanced and can have independently unbalanced harmonics disturbance signals. The heart of the converter is composed by three branches of 2 H-bridge converters each connected in cascade. Each branch providing injected voltages 117, 118 and 119, respectively. For instance, the cascade converter 121 is capable of providing a five level injected voltage 117. These voltages are coupled to the corresponding phase of the power distribution system via filter inductors 114, 115 and 116, respectively. Each H-bridge converter in a branch includes an output capacitor and an output resistor on the DC-side, 128 and 129, respectively, for the first H-bridge in the first branch. Capacitor voltages on the DC-side are listed from 122 to 127.

FIG. 2 depicts a detailed block diagram of the transformation processors, as well as the three-phase to stationary coordinate converter, all them used to obtain the signals required in the controller implementation. Input ports 201 and 202 are the source voltages vector and source currents vector, respectively. Blocks 203 and 204 contain the Clarke's transformation to convert from three-phase to stationary frame coordinates (123-coordinates to $\alpha\beta$-coordinates). The output ports 205 and 206 of these modules are the source voltages and source currents vectors in $\alpha\beta$-coordinates, respectively. Signals in the input ports 207 to 212 are the measured voltages across the output capacitors of each H-bridge converter. Each of these voltages is squared in multiplier modules 213 to 218. The squares are then multiplied by a corresponding constant gain in modules 219 to 224. The multiplexer modules 225, 226 and 227 combine the resulting expressions in their input ports to form vectors. These vectors are then operated by matrix modules 228 to 230. The demultiplexor modules 231 to 233 provide the state variables denoted by $z_j$ ($j \in \{1,2,3\}$) in output ports 234 to 236, and state variables denoted by $y_j$ in output ports 237 to 239.

FIG. 3 depicts a detailed block diagram of the proposed controller. Input ports 301 to 303 are the state variables that represents the dynamics of the sum of the squares of the capacitor voltages. These input ports are gathered in a single vector after multiplexer module 304. The resulting vector is then operated by matrix 305 and demultiplexed by module 306. As a result, a new set of variables $x_1$, $x_2$ and $x_3$ is obtained and available at output ports 307 to 309. Recall that this transformation is crucial in the developments as it allows to highlight a model structure that facilitates the design of the control loops.

The regulation controller receives variables $x_1$, $x_2$ and $x_3$ at input ports 307, 308 and 309, respectively, and their corresponding references at input ports 310, 311 and 312. The differences between variables $x_1$, $x_2$ and $x_3$, and their corresponding references are computed at difference modules 313, 314 and 315. These error signals are required to construct $g_1$, $g_2$ and $g_3$ via proportional plus integral (PI) schemes operating on the corresponding error signal. The PI modules are depicted in 316, 317 and 318. The output from the PI modules is multiplied by the scaled source voltages vector in modules 321 to 323. The source voltages vector is scaled by the square of its RMS value in the module 320. The products provided by the multiplier modules 321 to 323 are operated by the matrices in 324, 325 and 326, respectively. The outputs of these modules are accumulated by adder 327 to construct the currents reference vector $i^*_{S\alpha\beta}$.

Reference vector $i^*_{S\alpha\beta}$ is subtracted from the source currents vector $i_{S\alpha\beta}$, coming from input port 328, in adder 329. This results in the error signal $\tilde{i}_{S\alpha\beta}$. This error signal is multiplied by a predetermined constant $K_1$ in 330. The error signal $\tilde{i}_{S\alpha\beta}$ is also provided to a plurality of harmonic or resonant filters depicted in 331. Other resonant filters may be added depending on the considered harmonics to compensate. In 331 only two resonant filters are shown to exemplify. The resonant frequency of each harmonic filter is given by $k\omega_0$, where k is the k-th pre-selected harmonic to compensate, wherein $k \in \{1,3,5,\ldots\}$. Each resonant filter of the plurality of resonant filters provide a control signal component which is accumulated and added in adder 332 to the damping term obtained in 330. The result of this sum is then added to source voltage $v_{S\alpha\beta}$ in adder 333 to generate the control vector $\epsilon_{\alpha\beta}$. This control vector is transformed from fixed frame coordinates to its original coordinates by means of transformation 334. This yields, after demultiplexing in 335, the control signals 336, 337 and 338.

For the balance controller, the control signals $\delta_1$, $\delta_2$ and $\delta_3$ in output ports 351, 352 and 353 are designed to force the difference of squares of the capacitor voltages $y_1$, $y_2$ and $y_3$ in input ports 339, 340 and 341 to zero. These control signals are obtained by multiplying the source voltages in original coordinates $v_{S1}$, $v_{S2}$ and $v_{S3}$ in input ports 342 to 344, with the corresponding auxiliary variables $\rho_1$, $\rho_2$ and $\rho_3$. These last are obtained with proportional plus integral schemes 345, 346 and 347, actuating over variables $y_1$, $y_2$ and $y_3$.

FIG. 4 depicts a detailed block of the duty ratios processors, that is, the inverse transformations, required to recover the control inputs in their original coordinates, that is, $u_{ij}$ ($i \in \{1,2,3\}$, $j \in \{1,2,3\}$). This control inputs are later used in a modulation scheme to generate the switching sequence for every single switching device. The control inputs for the H-bridges on the top of each branch are represented by $u_{i1}$, where $i \in \{1,2,3\}$ represents the corresponding branch, and are delivered to output ports 434, 436 and 438, respectively. These control inputs are formed by the addition $\epsilon_i + \delta_i$ ($i \in \{1, 2,3\}$), or equivalently using matrix operations 416 to 418, multiplexers 413 to 415 and demultiplexers 419 to 421. This sum is then divided by the capacitor voltage $v_{Ci1}$ of the corresponding top H-bridge in each branch using modules 422, 424 and 426. The results are then divided by two in modules 428, 430 and 432. The control inputs for the H-bridges on the bottom of each branch are represented by $u_{i2}$, where as before $i \in \{1,2,3\}$ represents the corresponding branch, and are available in output ports 435, 437 and 439. They are formed by the difference $\epsilon_i - \delta_i$ ($i \in \{1,2,3\}$), or equivalently using matrix operations 416, 417 and 418, multiplexers 413 to 415 and demultiplexers 419 to 421. This difference is then divided by the capacitor voltage $v_{Ci2}$ ($i \in \{1,2,3\}$) of the corresponding bottom H-bridge in each branch using modules 423, 425 and 427. The results are then divided by two in modules 429, 431 and 433.

FIG. 5 shows the steady state responses of the controlled system with the proposed solution. It is shown that the compensated source current $i_{S1}$ in plot 502 is an almost sinusoidal signal in phase with the source voltage $v_{S1}$ in plot 501, despite of the highly distorted load current $i_{o1}$ in plot 503. Plot 504 shows the injected current $i_1$ produced by the active filter under the proposed controller.

FIG. 6 shows the capacitors voltages transient responses during load step changes. In this case a non controlled three phase diode rectifier feeding a simple resistor has been considered as the nonlinear load. The transients are due to changes in this resistor from 100Ω to 20Ω and back to 100Ω. On each plot there are two curves one for each capacitor voltage belonging to the same branch. The responses of capacitor voltages in the top H-bridges are indicated with

601, 602 and 603, while those of the bottom H-bridges are indicated with 604, 605 and 606. In general, it is observed that after a relatively small transient, all capacitor voltages converges towards their common reference fixed to 150 $V_{DC}$ in this test.

FIG. 7 shows the scaled apparent conductance $G_1=g_1 v_{S,RMS}^2$ in indicated with 701 and the extra control inputs $G_2=g_2 v_{S,RMS}^2$ and $G_3=g_3 v_{S,RMS}^2$ indicated with 702 and 703, respectively, during a transient due to load step changes. Notice that, $G_1=g_1 v_{S,RMS}^2$ reaches a constant value proportional to the total dissipated power, while $G_2=g_2 v_{S,RMS}^2$ and $G_3=g_3 v_{S,RMS}^2$ reach zero in average after a relatively short transient.

FIG. 8 shows the injected voltage $\epsilon_1$ indicated by 802 as it is computed in the control algorithm, that is, as a continuous signal, and, indicated by 801, the real injected voltage measured at the terminals of each branch, where a multicarrier phase-shifted modulation algorithm was used.

What is claimed is:

1. A controller providing a control vector to a cascade H-bridge three-phase multilevel converter used as a shunt active filter, each phase of the multilevel converter composed of a series connection of two H-bridge cells, each of said phases of the multilevel converter providing a five-level voltage signal, each of said H-bridge cells composed of an H-bridge inverter having an output capacitor and an output resistor coupled across the said H-bridge, each of said H-bridge cells providing an output voltage, each of said phases of the multilevel converter coupled to a corresponding phase of a three-phase power distribution system via a corresponding inductor, each of said phases of the multilevel converter providing an injected current across the corresponding inductor, the said three phases of the multilevel converter connected among them in a star connection, the three phase power distribution system providing a source voltage and a source current for each phase to a corresponding three phase load, the controller comprising:
   a source current module operative to provide a signal indicative of the value of the source current in each phase;
   a source voltage module operative to provide a signal indicative of the value of the source voltage in each phase;
   an output voltage module operative to provide a signal indicative of the output voltage across the output capacitor of each H-bridge cell;
   a three-phase to stationary coordinate converter operative to convert the measured three-phase source current value into a source current value and to convert the three-phase source voltage value into a source voltage value in stationary coordinates;
   a voltages transformation processor 1 coupled to the output voltage module and receiving the output voltages across a first pair of output capacitors, the transformation processor 1 configured and arranged to provide variables $z_1$ and $y_1$;
   a voltages transformation processor 2 coupled to the output voltage module and receiving the output voltages across a second pair of output capacitors, the transformation processor 1 configured and arranged to provide variables $z_2$ and $y_2$;
   a voltages transformation processor 3 coupled to the output voltage module and receiving the output voltages across a third pair of output capacitors, the transformation processor 1 configured and arranged to provide variables $z_3$ and $y_3$;
   a coordinates transformation processor coupled to voltages transformation processors 1, 2 and 3, and receiving variables $z_i$ ($i \in \{1,2,3\}$), configured and arranged to provide state variables $x_i$ ($i \in \{1,2,3\}$);
   references for variables $x_i$ ($i \in \{1,2,3\}$);
   a control processor including:
   a regulation controller receiving variables $x_i$ ($i \in \{1,2,3\}$), their references, and a source voltage vector value in stationary coordinates, the regulation controller configured and arranged to provide a source current reference vector in stationary coordinates;
   a tracking controller coupled to the regulation controller receiving the source voltage vector value, the source current reference vector, and the source current reference vector value in stationary coordinates, the tracking controller configured and arranged to provide control variables $e_1$, $e_2$ and $e_3$;
   a balance controller receiving variables $x_1$, $x_2$ and $x_3$, and the source voltages values in three-phase coordinates, the balance controller configured and arranged to provided control variables $\delta_1$, $\delta_2$ and $\delta_3$;
   a duty ratios processor 1 receiving a control variable $\epsilon_1$ and the control variable $\delta_1$, and the output voltages across the first pair of output capacitors, the duty ratios processor 1 configured and arranged to provided control signals $u_{1j}$ ($j \in \{1,2\}$);
   a duty ratios processor 2 receiving a control variable $\epsilon_2$ and the control variable $\delta_2$, and the output voltages across the second pair of output capacitors, the duty ratios processor 2 configured and arranged to provided control signals $u_{2j}$ ($j \in \{1,2\}$);
   a duty ratios processor 3 receiving a control variable $\epsilon_3$ and the control variable $\delta_3$, and the output voltages across the third pair of output capacitors, the duty ratios processor 3 configured and arranged to provided control signals $u_{3j}$ ($j \in \{1,2\}$).

2. The controller of claim 1 wherein the source current module is a set of three current sensors.

3. The controller of claim 1 wherein the source voltage module is a set of three voltage sensors.

4. The controller of claim 1 wherein the output voltage module is a set of six voltage sensors.

5. The controller of claim 1 wherein the three-phase to stationary coordinate converter implements the Clarke's transformation $$T = \sqrt{\frac{2}{3}} \begin{pmatrix} 1 & -1/2 & -1/2 \\ 0 & \sqrt{3}/2 & -\sqrt{3}/2 \\ 1/\sqrt{2} & 1/\sqrt{2} & 1/\sqrt{2} \end{pmatrix}.$$

6. The controller of claim 1 wherein the voltages transformation processor 1 includes:
   a first capacitor voltage value $v_{c11}$ multiplied by itself forming a first product value $v_{c11}^2$; this product multiplied by a first constant value of ½ forming a second product value; this second product value entering as the first input of the multiplexer module;
   a second capacitor voltage $v_{c12}$ multiplied by itself forming a third product value $v_{c12}^2$; this product multiplied by a second constant value of ½ forming a fourth product value; this fourth product value entering as the second input of the multiplexer module; the multiplexer module providing a vector to be operated by a matrix module $$\begin{bmatrix} 1 & 1 \\ 1 & -1 \end{bmatrix}$$

forming a second vector $$\begin{bmatrix} z_1 \\ y_1 \end{bmatrix};$$

this second vector is introduced to the demultiplexer module providing two variables: the first variable $z_1$ is the sum of the square of the capacitor voltages multiplied by ½; the second variable $y_1$ is the difference of the square of the capacitor voltages multiplied by ½; these variables expressed by $$z_1 = \frac{v_{C11}^2}{2} + \frac{v_{C21}^2}{2} \text{ and } y_1 = \frac{v_{C11}^2}{2} - \frac{v_{C21}^2}{2},$$

respectively.

7. The controller of claim 1 wherein the voltages transformation processor 2 has a similar operation as the voltages transformation processor 1, providing the variables $$z_2 = \frac{v_{C21}^2}{2} + \frac{v_{C22}^2}{2} \text{ and } y_2 = \frac{v_{C21}^2}{2} - \frac{v_{C22}^2}{2}.$$

8. The controller of claim 1 wherein the voltages transformation processor 3 operates equal to the voltages transformation processor 1, providing the variables $$z_3 = \frac{v_{C31}^2}{2} + \frac{v_{C32}^2}{2} \text{ and } y_3 = \frac{v_{C31}^2}{2} - \frac{v_{C32}^2}{2}.$$

9. The controller of claim 1 wherein the coordinates transformation processor includes: a multiplexer module providing a first vector $[z_1, z_2, z_3]^T$; this vector to be operated by the matrix module $$\begin{bmatrix} 1 & 1 & 1 \\ 0 & -\sqrt{3} & \sqrt{3} \\ 2 & -1 & -1 \end{bmatrix}$$

forming a second vector $$\begin{bmatrix} x_1 \\ x_2 \\ x_3 \end{bmatrix} = \begin{bmatrix} 1 & 1 & 1 \\ 0 & -\sqrt{3} & \sqrt{3} \\ 2 & -1 & -1 \end{bmatrix} \begin{bmatrix} z_1 \\ z_2 \\ z_3 \end{bmatrix};$$

this second vector is split in the state variables $x_1 = z_1 + z_2 + z_3$, $x_2 = -\sqrt{3}z_2 + \sqrt{3}z_3$ and $x_3 = 2z_1 - z_2 - z_3$ by means of the demultiplexer module.

10. The controller of claim 1, further including a variable $V_d$, wherein the references for variables $x_1$, $x_2$ and $x_3$ includes: $x^*_1 = 3V_d^2$ as the reference for $x_1$, $x^*_2 = 0$ as the reference for $x_2$, and $x^*_3 = 0$ as the reference for $x_3$.

11. The controller of claim 1 wherein the regulation controller, included in the control processor, includes: a first difference module forming a first difference value equal to the difference between the state variable $x_1$ and its reference value; a second difference module forming a second difference value equal to the difference between the state variable $x_2$ and zero; a third difference module forming a third difference value equal to the difference between the state variable $x_3$ and zero; a first proportional-integral scheme, with proportional constant $k_{p1}$ and integral constant $k_{i1}$, operating over the first difference value forming $$G_1 = g_1 v_{S,RMS}^2 = -k_{p1}\tilde{x}_1 - k_{i1}\int_0^t \tilde{x}_1 dt,$$

that is, the apparent conductance observed by the source; a second proportional-integral scheme, with proportional constant $k_{p2}$ and integral constant $k_{i2}$, operating over the second difference value forming $$G_2 = g_2 v_{S,RMS}^2 = -k_{p2}x_2 - k_{i2}\int_0^t x_2 dt;$$

a third proportional-integral scheme, with proportional constant and integral constant $k_{p3}$ and integral constant $k_{i3}$, operating over the third difference value forming $$G_3 = g_3 v_{S,RMS}^2 = -k_{p3}x_3 - k_{i3}\int_0^t x_3 dt;$$

a scale factor multiplying the source voltage vector in stationary coordinates forming a scaled source voltage vector $$\frac{v_{S\alpha\beta}}{v_{S,RMS}^2};$$

the $G_1 = g_1 v_{S,RMS}^2$ is multiplied by the scaled source voltage vector $$\frac{v_{S\alpha\beta}}{v_{S,RMS}^2}$$

forming a first component of the current reference $$g_1 \begin{bmatrix} 1 & 0 \\ 0 & 1 \end{bmatrix} v_{S\alpha\beta} = g_1 M_1 v_{S\alpha\beta};$$

the $G_2 = g_2 v_{S,RMS}^2$ is multiplied by the scaled source voltage vector $$\frac{v_{S\alpha\beta}}{v_{S,RMS}^2}$$

forming a second component of the current reference $$g_2 \begin{bmatrix} 1 & 0 \\ 0 & -1 \end{bmatrix} v_{S\alpha\beta} = g_2 M_2 v_{S\alpha\beta};$$

the $G_3 = g_3 v_{S,RMS}^2$ is multiplied by the scaled source voltage vector $$\frac{v_{S\alpha\beta}}{v_{S,RMS}^2}$$

forming a third component of the current reference $$g_3 \begin{bmatrix} 0 & 1 \\ 1 & 0 \end{bmatrix} v_{S\alpha\beta} = g_3 M_3 v_{S\alpha\beta};$$

a first adder module adding the first, second and third component of the current reference to form an overall current reference vector given by $$i^*_{S\alpha\beta} = g_1 \begin{bmatrix} 1 & 0 \\ 0 & 1 \end{bmatrix} v_{S\alpha\beta} + g_2 \begin{bmatrix} 1 & 0 \\ 0 & -1 \end{bmatrix} v_{S\alpha\beta} + g_3 \begin{bmatrix} 0 & 1 \\ 1 & 0 \end{bmatrix} v_{S\alpha\beta}$$
$$= g_1 M_1 v_{S\alpha\beta} + g_2 M_2 v_{S\alpha\beta} + g_3 M_3 v_{S\alpha\beta}.$$

12. The controller of claim 1 wherein the tracking controller, included in the control processor, includes: a first difference module forming a current error signal equal to the difference between the source current vector and a reference current vector $\tilde{i}_{S\alpha\beta} = (i_{S\alpha\beta} - i^*_{S\alpha\beta})$ in stationary coordinates; a first gain factor $K_1$ multiplying a current error vector providing a proportional control signal $K_1 \tilde{i}_{S\alpha\beta}$; a harmonic compensator including a plurality of second order harmonic filters of the form $$\frac{2\gamma_k s}{s^2 + k^2 \omega_0^2},$$

each having a resonant frequency tuned at selected harmonic components to compensate $k\omega_0$, $k \in \{1,3,5,\ldots\}$, where $\gamma_k$ is the positive gain of the k-th harmonic filter, each of the plurality of second order harmonic filters receiving the current error vector and providing a plurality of filtered outputs; the harmonic compensator providing a harmonic control signal formed by the addition of the plurality of filtered outputs, that is, $$\sum_{k \in \{1,3,5,\ldots\}} \text{diag}\left\{ \frac{2\gamma_k s}{s^2 + k^2 \omega^2}, \frac{2\gamma_k s}{s^2 + k^2 \omega^2} \right\} \tilde{i}_{S\alpha\beta};$$

a first adder module adding the proportional control signal, the harmonic control signal and the source voltage vector in stationary coordinates forming a control vector $$\varepsilon_{\alpha\beta} = K_1 \tilde{i}_{S\alpha\beta} + v_{S\alpha\beta} + \sum_{k \in \{1,3,5,\ldots\}} \text{diag}\left\{ \frac{2\gamma_k s}{s^2 + k^2 \omega^2}, \frac{2\gamma_k s}{s^2 + k^2 \omega^2} \right\} \tilde{i}_{S\alpha\beta};$$

a stationary to three-phase coordinates converter module receiving the control vector and providing the control vector $\epsilon_{123}$ with $\epsilon_{\alpha\beta}$; the control vector in three-phase coordinates is split in control signals $\epsilon_1$, $\epsilon_2$ and $\epsilon_3$ by means of the demultiplexer.

13. The controller of claim 1 wherein the balance controller, included in the control processor, includes: a first proportional-integral scheme, with proportional constant $\beta_{p1}$ and integral constant $\epsilon_{i1}$, operating over a state variable $y_1$ providing an auxiliary variable $$\rho_1 = -\beta_{p1} y_1 - \beta_{i1} \int_0^t y_1 d\tau;$$

a second proportional-integral scheme, with proportional constant $\beta_{p2}$ and integral constant $\beta_{i2}$, operating over a state variable $y_2$ providing an auxiliary variable $$\rho_2 = -\beta_{p2} y_2 - \beta_{i2} \int_0^t y_2 d\tau;$$

a third proportional-integral scheme, with proportional constant $\beta_{p3}$ and integral constant $\beta_{i3}$, operating over a state variable $y_3$ providing an auxiliary variable $$\rho_3 = -\beta_{p3} y_3 - \beta_{i3} \int_0^t y_3 d\tau;$$

the auxiliary variable $\rho_1$ multiplied by a variable $v_{S1}$ forming a control variable $\delta_1 = \rho_1 v_{S1}$; the auxiliary variable $\rho_2$ multiplied by $v_{S2}$ forming the control variable $\delta_2 = \rho_2 v_{S2}$; the auxiliary variable $\rho_3$ multiplied by $v_{S3}$ forming the control variable $\delta_3 = \rho_3 v_{S3}$.

14. The controller of claim 1 wherein the duty ratios processor 1, included in the control processor, includes: a multiplexer module forming a control vector with two control variables $\epsilon_1$ and $\delta_1$; a matrix module operating over the control vector providing an auxiliary vector of the combined control variables; a demultiplexer module providing the sum and the difference of the control variables, that is, $(\epsilon_1 + \delta_1)$ and $(\epsilon_1 - \delta_1)$; a first divisor module dividing the sum of the control variables over the value of a first capacitor voltage forming a first product value; a second divisor module dividing the difference of the control variables over the value of a second capacitor voltage forming a second product value; the first product multiplied by a first constant value of ½ forming the first control signal; the second product multiplied by a second constant value of ½ forming the second control signal; the first control signal is expressed by $$u_{11} = \frac{\varepsilon_1 + \delta_1}{2v_{C11}}$$

and the second control signal is expressed by $$u_{12} = \frac{\varepsilon_1 - \delta_1}{2v_{C12}}.$$

15. The controller of claim 1 wherein the duty ratios processor 2, included in the control processor, operates equal to the duty ratios processor 1, providing the control signals $$u_{21} = \frac{\varepsilon_2 + \delta_2}{2v_{C21}} \text{ and } u_{22} = \frac{\varepsilon_2 - \delta_2}{2v_{C22}}.$$

16. The controller of claim 1 wherein the duty ratios processor 3, included in the control processor, operates equal to the duty ratios processor 1, providing the control signals $$u_{31} = \frac{\varepsilon_3 + \delta_3}{2v_{C31}} \text{ and } u_{32} = \frac{\varepsilon_3 - \delta_3}{2v_{C32}}.$$

17. The regulation controller of claim 11 wherein the proportional-integral scheme constants $k_{p1}$, $k_{i1}$, $k_{p2}$, $k_{i2}$, $k_{p3}$ and $k_{i3}$ are predetermined design constants that are greater than zero.

18. The balance controller of claim 13 wherein the proportional-integral scheme constants $\beta_{p1}$, $\beta_{i1}$, $\beta_{p2}$, $\beta_{i2}$, $\beta_{p3}$ and $\beta_{i3}$ are predetermined design constants that are greater than zero.

19. The tracking controller of claim 12 wherein the gain $K_1$ is a predetermined design constant that is greater than zero.

20. The controller of claim 11 wherein the source current reference vector $$\vec{i}^*_{S\alpha\beta} = g_1 \begin{bmatrix} 1 & 0 \\ 0 & 1 \end{bmatrix} v_{S\alpha\beta} + g_2 \begin{bmatrix} 1 & 0 \\ 0 & -1 \end{bmatrix} v_{S\alpha\beta} + g_3 \begin{bmatrix} 0 & 1 \\ 1 & 0 \end{bmatrix} v_{S\alpha\beta}$$
$$= g_1 M_1 v_{S\alpha\beta} + g_2 M_2 v_{S\alpha\beta} + g_3 M_3 v_{S\alpha\beta}$$

includes two extra terms $g_2 M_2 v_{S\alpha\beta}$ and $g_3 M_3 v_{S\alpha\beta}$ associated to control inputs $g_2$ and $g_3$, respectively, that distort this reference current in order to balance the capacitor voltages.

21. The current reference of claim 20 wherein the two extra control inputs $g_2$ and $g_3$ vanish once the capacitor voltages are balanced, thus, making the current reference $i^*_{S\alpha\beta}$ proportional to the source voltage $v_{S\alpha\beta}$ in the steady state.

22. The controller of claim 1 wherein the number of levels of the multilevel converter can be scaled to a higher number with corresponding modifications and increase of control and sensed signals.

* * * * *